United States Patent [19]
Tico

[11] 3,955,343
[45] May 11, 1976

[54] FRUIT HARVESTING MACHINE

[76] Inventor: Ramon Tico, Doctor Roux, 100, Barcelona, Spain

[22] Filed: Oct. 21, 1974

[21] Appl. No.: 516,419

[30] Foreign Application Priority Data
Oct. 19, 1973 Spain .................................. 419965
Aug. 1, 1974 Spain .................................. 429506

[52] U.S. Cl. .............................. 53/391; 214/1 R; 214/42 R; 214/83.34; 214/300
[51] Int. Cl.² ........................................ A01D 90/00
[58] Field of Search ............. 198/134, 186; 242/67, 242/67.1 R; 214/83.34, 300, 1 R, 311, 42 R, 519; 56/330; 53/390, 391, 328 R

[56] References Cited
UNITED STATES PATENTS
1,199,790 10/1916 Holcomb ............................. 242/67
1,881,143 10/1932 Smith .................................. 214/519
3,623,309 11/1971 Stang et al. ........................... 56/330
3,762,577 10/1973 Olmo et al. ......................... 214/519

*Primary Examiner*—Robert J. Spar
*Assistant Examiner*—Lawrence J. Oresky

[57] ABSTRACT

A fruit harvesting machine comprising means for picking up, rolling up and storing an elongated discontinuous flexible belt previously laid on the ground between two successive rows of plants whose fruit is to be harvested, and means cooperating with said first-named means for transferring the fruit harvested and carried on said flexible belt to container means for transportation.

1 Claim, 9 Drawing Figures

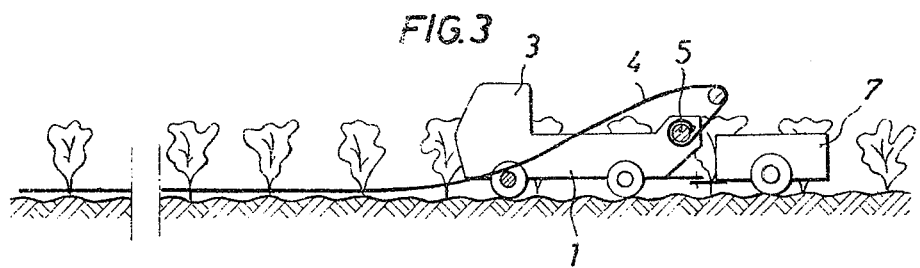
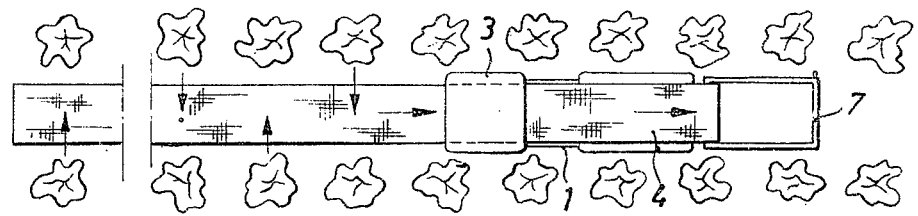
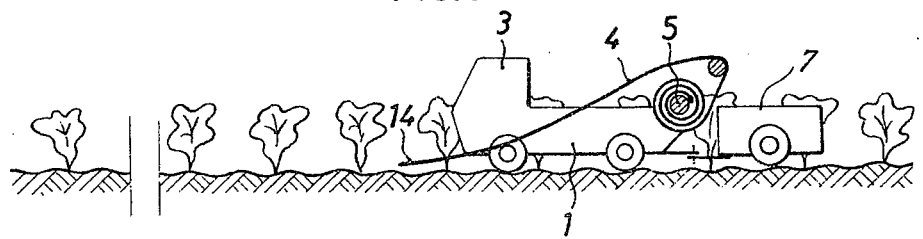

FRUIT HARVESTING MACHINE

BACKGROUND OF THE INVENTION

The invention relates to a machine for mechanizing the harvesting of certain fruits, especially grapes.

As it is known, the harvesting of grapes is a difficult operation and requires a large amount of labor, since the clusters of grapes have to be cut individually and placed in hand baskets which afterwards are dumped into larger containers which are transported to the place where the grape juice is processed.

SUMMARY OF THE INVENTION

The machine that is the subject of the present invention is designed to permit the harvesting of grapes by placing them on flexible belts laid on the ground between two adjacent rows of vines, the flexible belt being taken up mechanically and the picked grapes being deposited in appropriate containers disposed on a trailer hauled by the same machine or by other systems, such that the picked grapes can be carried transversely of the machine and be deposited in a vehicle or container provided in the area between vines adjacent to the area in which the machine is moving.

Essentially, the machine of the present invention is based upon a system permitting the picking up and winding of an elongated and discontinuous flexible belt, while the grapes deposited on said belt are being transferred to the transport containers, and at the same time the machine unwinds the said belt, laying it on the ground between two consecutive rows of vines, so that it can be loaded again with the grapes cut manually from the vines.

Therefore, it is essential in the machine of the present invention to have means for the guidance of an elongated and discontinuous flexible belt in the form of a roller train, an area for the unloading of the fruit gathered on the flexible belt, and a drum for the winding of said belt, with mechanisms providing for the driving of said drum and the displacement of the chassis on which the assembly necessary for the machine is mounted. To this end, the machine will basically have a self-propelled chassis structure on which the said assembly will be disposed, and, if desired, means for hitching thereto a trailer carrying the containers for the picked grapes, or else mechanisms for the transfer of picked grapes to another type of vehicle, in arrangements which may also be transverse arrangements with respect to the longitudinal axis of the machine.

BRIEF DESCRIPTION OF THE DRAWING

For better comprehension a number of drawings are appended hereto showing, by way of example, a machine constructed in accordance with the present invention.

FIGS. 3, 4 and 5 are diagrammatic views of the operation of the machine, showing the arrangement of one flexible belt fully laid out and another in the wound-up state.

DETAILED DESCRIPTION OF PREFERRED EMBODIMENTS

Figure 1:
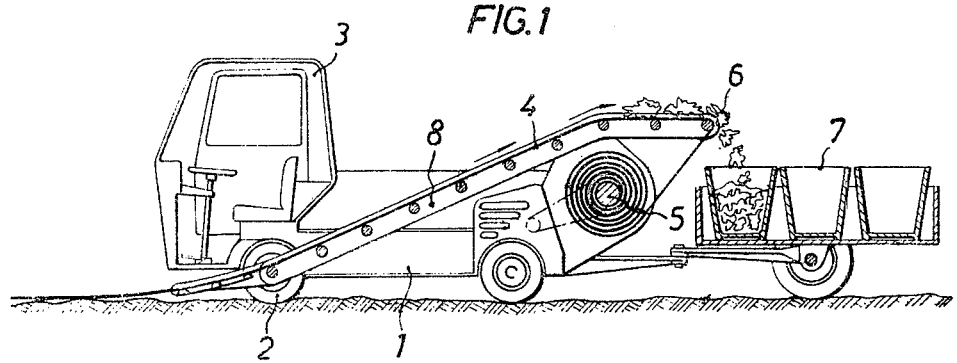
FIGS. 1 and 2 are elevational and plan views, respectively, partially in cross section and in phantom, of a machine in accordance with the present invention, provided with a system for transporting the grapes axially through the machine.

As it can be seen in the drawings, the machine of the present invention is essentially comprised of a self-propelled chassis 1 equipped with wheels 2, a cab 3 for the driver, and means for the guiding, winding and unwinding of an elongated, discontinuous belt 4, which is to be laid on the ground between two adjacent rows of vines to receive the grapes cut by hand, and is then to be connected to the machine to be hauled in and wound on a drum 5 while at the same time the fruit 6 is being transferred to conventional containers 7 which are to carry the grapes to the place where the grape juice is processed.

Figure 2:
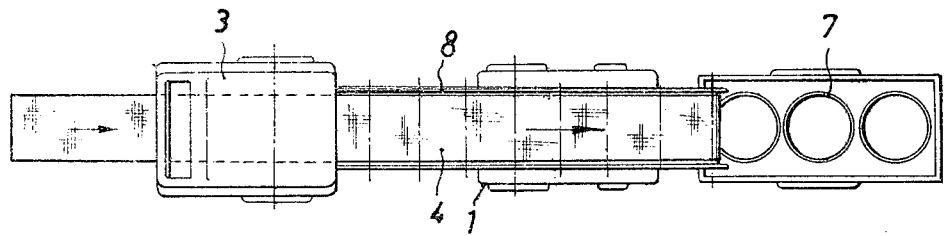
Figure 6:
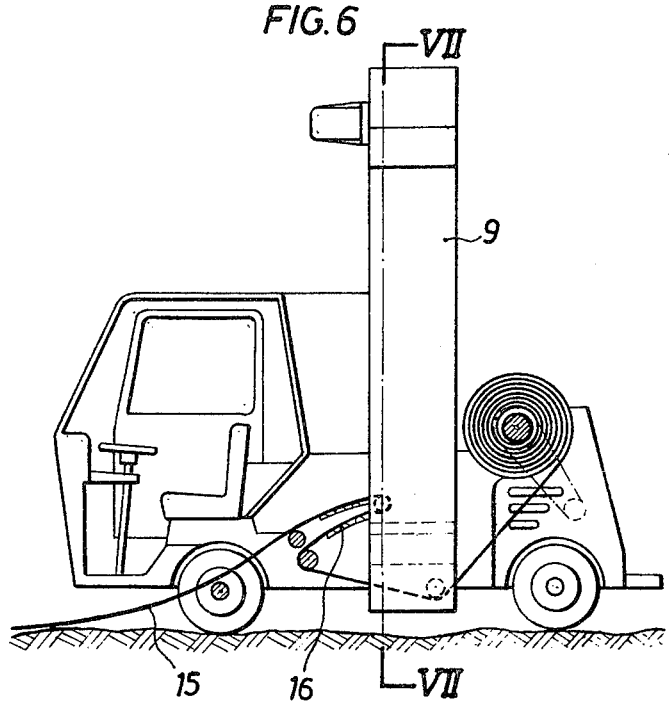
FIG. 6 is a side elevational view showing an arrangement for the transverse movement of grapes.
Figure 7:
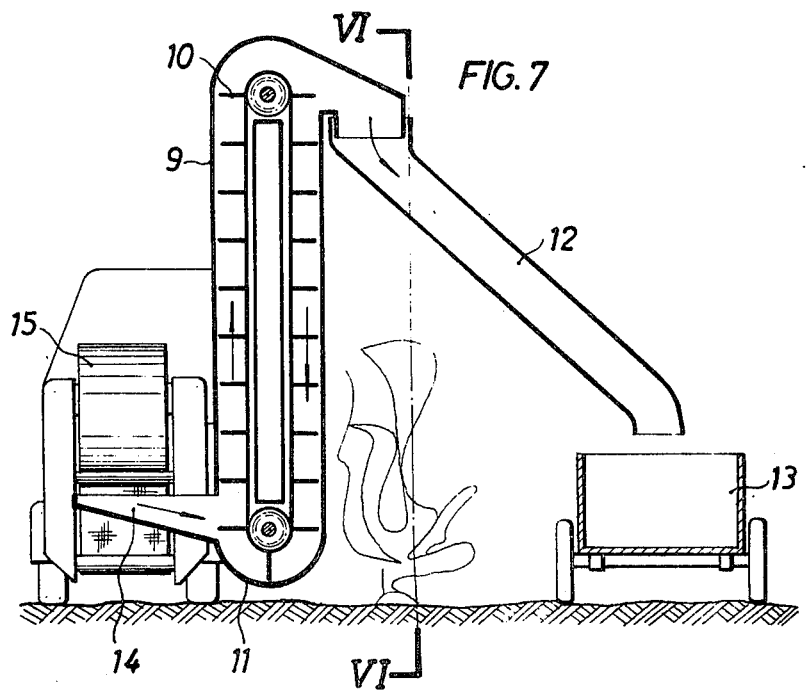
FIG. 7 is an elevational view in a plane perpendicular to that of FIG. 1, showing the arrangement of a transverse unloading mechanism.

To fulfill this purpose, the machine will have a mechanical system for driving in one or the other direction the drum 5, and a system will also be provided to permit the transfer of the harvested grapes. In FIGS. 1 and 2, such system consists in having a guide roller train projecting rearwardly in the form of a cantilever 8 extending from the rear of the machine, thus enabling the harvested grapes to drop by gravity into containers provided underneath the said cantilever or extension.

In other cases, the transfer of the harvested grapes transversely can be accomplished by means of a different nature.

In FIGS. 6, 7, 8 and 9 is shown the arrangement of a mechanism for transferring the harvested grapes transversely of the machine.

The said mechanism consists of a housing 9 disposed vertically and provided with two parallel beams on which a bucket conveyor 10 runs, which picks up the grapes from an ample hopper 11 at the bottom of the housing and dumps them into an outer chute 12 desigend to dump them into a container 13, such as the body of a farm wagon or other suitable container.

This system is supplemented by a tray 14 which receives the grapes conveyed to it by the discontinuous flexible belt 15, which is of the same general characteristics as the one in the longitudinal unloading or transfer system.

Figure 9:
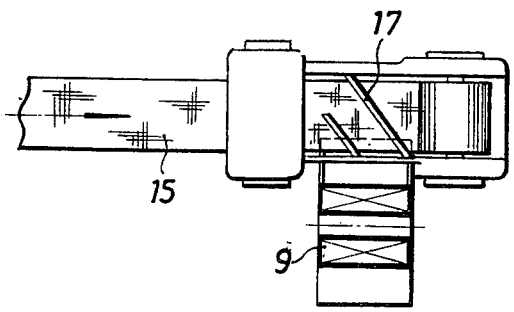

The only difference is that the flexible belt 15 is passed around an internal loop 16 so as to create an internal discharge zone, such as represented in FIG. 9, in which a plurality of deflectors 17 enable the harvested grapes to pass over into the bottom hopper of the housing 9 and thus enable the grapes to be picked up by the buckets of a conveyor.

By this arrangement it is possible to effect the transfer of the harvested grapes from the space between two rows of vines to another immediately adjacent space between rows, which facilitates the operation in some cases and reduces the total length of the machine.

Figure 8:
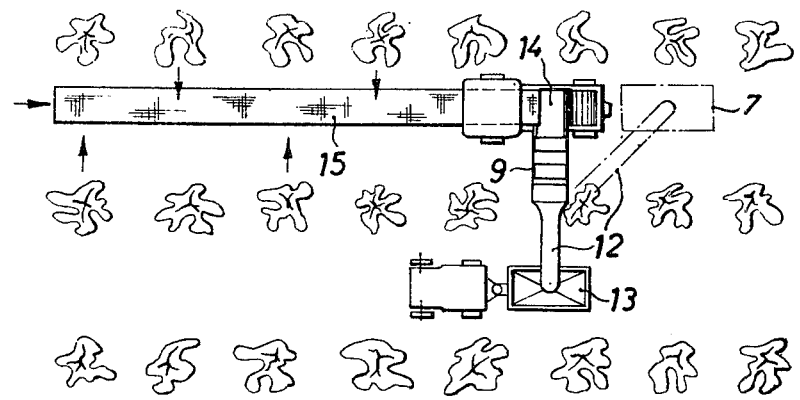
FIGS. 8 and 9 are diagrammatical views representing the above transverse unloading system.

As it can be seen in FIG. 8, the said arrangement can easily permit the outer discharge chute 12 to swivel, so that the position of the harvest container 13 may vary. An optional position of the said discharge chute 12 is represented in broken lines; in this position the container 7 would be deployed in line with the machine.

In any case, it is a feature of the machine of the present invention that it permits the picking up and winding or reeling of elongated, discontinuous flexible belts previously laid between two rows of vines, after the said belts have received the grapes, and furthermore the rearward arrangement of said flexible belts makes it possible, after the grapes have been removed from them, to lay them again in a space between rows of vines for another gathering cycle.

It can be understood that, although the machine of the present invention is especially applicable to the harvesting of grapes, it can also be used for the gathering of any fruits in which the technical characteristics of this machine may prove advantageous.

One of the important advantages which are obtained by means of the machine of the present invention is that the grape receives much more gentle treatment than in the traditionally known hand harvesting systems, and this is of substantial benefit in the production of certain select wines.

Likewise, one of the important advantages of the present machine is that of achieving a very high rationalization in the harvesting of grapes and other similar fruits, since it eliminates the frequent moving about of the workers involved in the harvesting of the grapes, for the purpose of dumping the hand-carried baskets into other containers of greater capacity, thus making it possible to reduce the work force needed for the harvesting of grapes. In particular, a machine of the present invention can handle a large area of vineyard or orchard because of the flexible belts between rows and picking them up after they have been filled with fruit can be performed at great speed with a single machine. Also, it is possible to stagger the work shifts between the harvesting crews and the machine, as the machine can work by night, if necessary, picking up part of the grapes picked during the day and laid on flexible belts of the kind described.

It is also to be understood that the flexible belts may vary as to materials used, which may be used, which may be textiles, plastics, snythetic rubbers etc., and as to their shape, which may be flat or concave with the concavity facing upwardly, or they may be compartmented by means of removable or built-in cross members to achieve better holding and transportation of the grapes.

In addition, the arrangement of the blet with respect to the machine will ordinarily be coincident or substantially coincident with the longitudinal axis thereof, in order to minimize the width of the machine; it is coincident in the examples shown in the drawings, but lateral arrangements with respect to the machine can also be adopted.

Anything which does not affect, alter, change or modify the essence of the machine described will be variable for the effects of the present invention.

I claim:

1. A fruit harvesting machine comprising: means at the front end of said machine for picking up an elongated discontinuous flexible belt previously laid on the ground between two successive rows of plants whose fruit is to be harvested, means for guiding, supporting, and moving said flexible belt in said machine from said front end thereof towards the rear, said last mentioned means comprising roller train means extending rearwardly from said machine, container means coupled to said fruit harvesting machine for receiving the fruit from said flexible belt supported on said roller train means, and drum means located beneath said roller train means for winding up said belt.

* * * * *